July 4, 1950

S. F. HUSSAIN 2,514,158

SPEED REGULATING DEVICE

Filed Nov. 21, 1947

2 Sheets-Sheet 2

INVENTOR
SYED FIRASAT HUSSAIN

BY *Richardson, David & Nordon*

ATTORNEYS

Patented July 4, 1950

2,514,158

UNITED STATES PATENT OFFICE 2,514,158

SPEED REGULATING DEVICE

Syed Firasat Hussain, Syednagar, Punjab, India

Application November 21, 1947, Serial 787,269
In British India March 4, 1947

7 Claims. (Cl. 74—681)

This invention relates to a speed control or regulating device and has for its object to propose a device by which it will be possible to have a very elastic control of speed, so that at very low speeds high power can be transmitted e. g., in a tractor.

According to this invention the speed control device comprises a primary and a secondary drive shaft, adapted to be driven at varying speeds with respect to each other, the primary shaft carrying two toothed wheels, one fixedly and the other loosely mounted thereon, the fixed wheel being adapted to drive through intermediate pinions, a primary driven toothed wheel, said intermediate pinions being mounted on shafts secured to the loosely mounted wheel, which in turn is driven by the secondary drive which also drives a secondary driver wheel, a set of follower pinions between the secondary driver wheel and the primary driver wheel, the load shaft being operated by a disc or the like carrying the said follower wheels.

Thus in accordance with this invention the device comprises a primary and a secondary drive shaft adapted to be driven at varying speeds, the shaft of the primary drive carrying two toothed wheels, one fixedly and the other loosely mounted thereon, the fixed wheel being adapted to drive a primary driven toothed wheel through a set of intermediate pinions, said pinions being mounted on shafts secured to the loosely mounted wheels, the driven toothed wheel being mounted on bearings on a side cap secured to the said loosely mounted wheel, the intermediate pinions engaging the primary driven toothed wheel through slots or openings in the annular body of the cap, a set of follower pinions between the primary driven toothed wheel and the secondary driver wheel driven by the secondary drive at a speed equal to or different from the primary drive, the loosely mounted wheel being also driven by the secondary drive.

Figure 1:
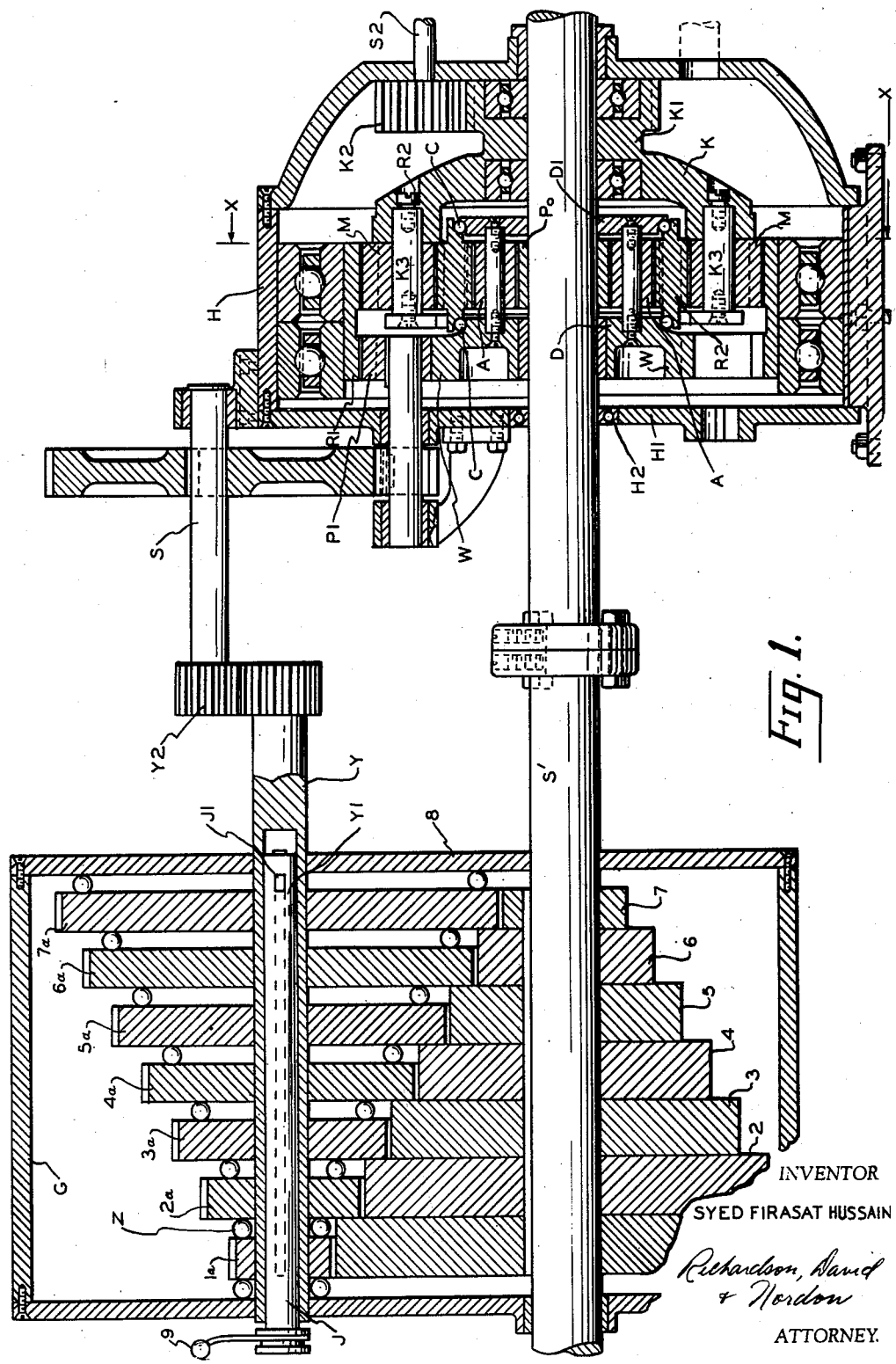
Figure 2:
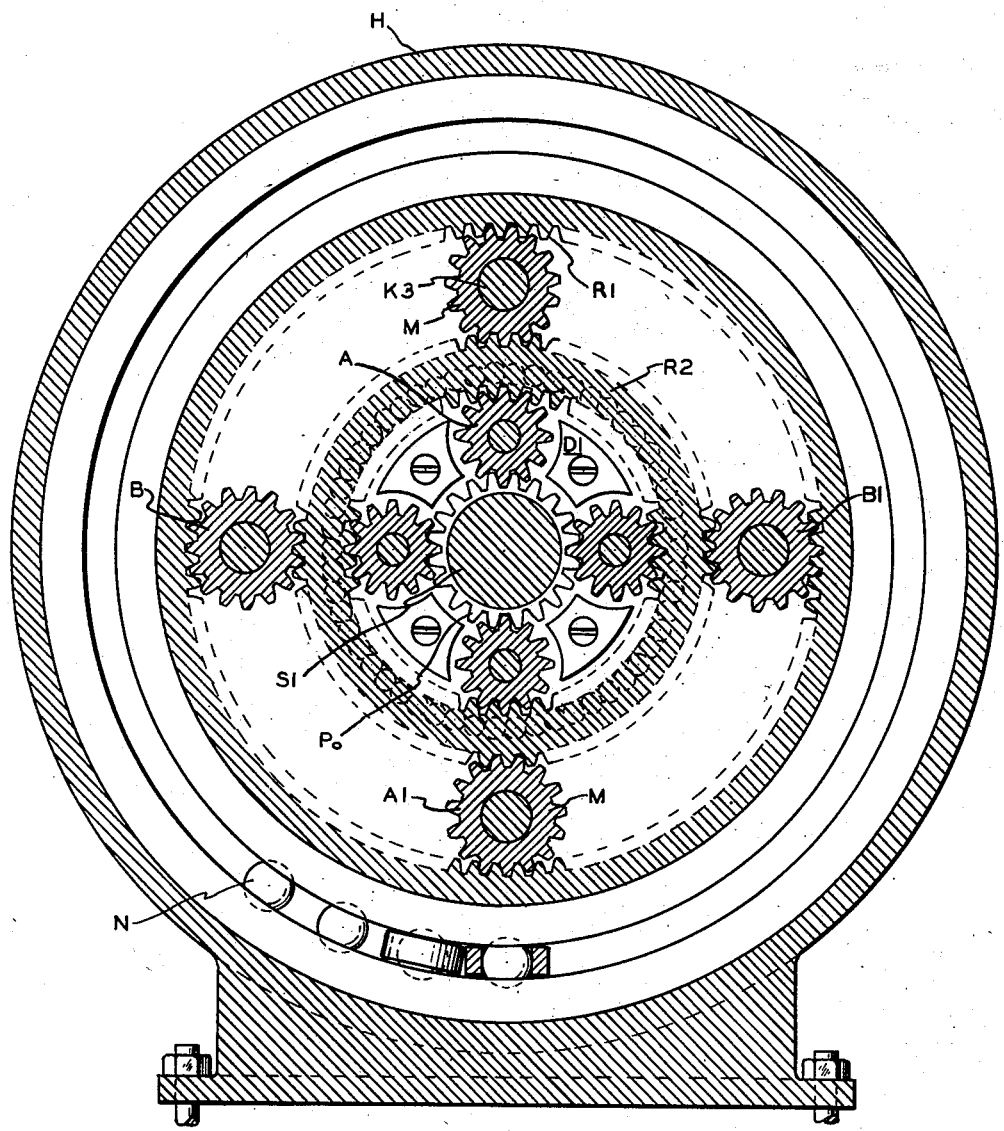

The invention will now be more fully described with reference to the accompanying drawings in which: Fig. 1 shows a sectional elevation of the device. Fig. 2 shows a cross sectional elevation at XX in Fig. 1.

Referring to the drawings H shows an outer housing in which the device according to my invention is mounted.

There are two drives, one the primary drive and the other the secondary drive and by varying the speeds of the two, the relative speed of the driven wheel is obtained.

S1 is the primary drive shaft supported in ball bearings H2 in the end plates or walls H1 of the housing H. To the shaft S1 is fixedly mounted a toothed wheel P0 and on the same shaft is also loosely mounted a toothed wheel W. The shaft S1 also carries a loosely mounted disc K which is the driven disc, said disc has a boss K1 toothed at its periphery and adapted to drive a toothed wheel K2 mounted on a load shaft S2.

To the loosely mounted wheel W is secured a side cap D having intermediate pinions A mounted between said wheel W and a side cap D1 and engaging an outer ring R2 referred to as a primary toothed wheel, which is toothed both at its inside as well as at its outer periphery. The wheel R2 is mounted on the annular body of cap D through two sets of ball bearing races C provided on either side of the wheel R2. The end plate D1 of the cap D is also loosely mounted on the shaft S1.

These pinions A engage the toothed wheel P0 and the inside of primary toothed wheel R2. The wheel R2 is free to rotate on the annular body of the end cap. R2 is the primary driven toothed wheel.

To the disc K are secured a number of pins K3 which carry loosely mounted follower pinions M having teeth A1, B, B1. These pinions engage the outer teeth of ring R2 and the teeth of an inner toothed ring R1, the secondary driver. The teeth of wheel R1 are also engaged by a secondary driving pinion P1, which is rigidly mounted on its shafts and is adapted to drive loosely mounted toothed wheel W at the same time.

Secondary driver wheel R1 is toothed at its inner periphery and is mounted within the housing through ball bearings N as shown.

Shaft S on which is mounted the pinion P1 is the secondary drive shaft.

Between shafts S1 and S is introduced a gear box to vary the speeds of the two shafts.

On the shaft S1 and within the gear box are mounted a set of gear wheels 1 to 7 of different sizes.

Within the housing G of the gear box are also mounted toothed wheels 1a to 7a and means for causing one of these wheels to engage wheels 1 to 7. The arrangement of mounting toothed wheels 1a to 7a is as follows:

The toothed wheels 1a to 7a are loosely mounted on a hollow spindle Y and spaced by ball thrust bearings Z.

Within the hollow spindle is a sliding rod J which carries a key J1. This key slides in a longitudinal slot Y1 formed in the hollow spindle Y. At the inside bore of the toothed wheels 1a to 7a are cut a series of keyways (not shown), so that a ready engagement of the key J1 may take place with selected ones of said keyways when the sliding rod J is turned. In this manner it is possible to effect the engagement of any of the toothed wheels 1a to 7a to the key and consequently the hollow spindle Y. Thus only one of the wheels 1a to 7a will be driven by one of the corresponding wheels 1 to 7 on the shaft S1. By this arrangement the speed of spindle Y can be varied relative to S1.

The rod J is made to slide by a fork-shaped lever 9 or by any other convenient arrangement, such as by an oil operated piston.

The spindle Y is connected to secondary drive shaft S through gearing or a clutch Y2 which absorbs the gear changing shock.

Keyways are also formed in the end plate 8 of the gear box, so that when the key J1 engages one of the keyways in the plate 8, the spindle Y is locked.

By means described above we obtain different speeds of secondary drive shaft S with respect to the primary drive shaft S1.

Working of the unit

As stated before S1 and S are the primary and secondary driving shafts. Their relative motion is adapted to drive the follower or driven disc K. The rotation of the two shafts at different speeds results in the movement of the follower or driven disc K.

S1 is the main shaft which is coupled directly to some high speed prime mover. This shaft is adapted to drive at variable speeds the secondary drive shaft S through e. g., a gear box of the type as shown. In the gear box it will be noted that each pair of wheels is always in gear but only one pair of wheels is operated at any time, this depending upon the position of the sliding rod J. A suitable index can be arranged to show which pair of wheels is intended to be operated.

When the shafts S and S1 are revolved, the shaft S1 will revolve fixedly mounted toothed wheel $P_0$, which in turn will drive primary toothed wheel R2 through intermediate pinions A. Between the wheel R2 and the secondary driver wheel R1 are the follower pinions M.

The secondary driver wheel R1 is being driven by secondary driving pinion P1 on shaft S at a speed different from that of shaft S1. The difference of speed between R1 and R2 causes the follower pinions M to revolve in clock or anticlockwise direction depending upon which of the wheels R1 and R2 has a greater speed. The movement of the follower pinions M results in the rotation of disc K which in turn causes the load shaft S2 to turn.

By this device a very elastic control of speed of shaft S2 can be obtained.

Let us assume first that W and $P_0$ are moving at the same speed. In that case pinions A, will be stationary and R2 will be rotating at the same speed as W.

For the purpose of clearness and explanation it is presumed that R2 and W are of the same size and have the same number of teeth.

Now when W and $P_0$ are rotating at the same speed in the same direction and P1 which is rotating W is also rotating R1, the linear speed of W, R1 and R2 will be same, and as R1 and R2 are moving in opposite directions with respect to each other, the follower pinions M rotate only on their own axis, so that there is no circumferential motion imparted to the follower pinion and consequently the disc K remains stationary and the load shaft S2 does not move.

Now the speed of $P_0$ is increased relative to W and let us presume that it is moving clockwise. $P_0$ turning clockwise will turn pinions A anticlockwise which in turn will rotate R2 anticlockwise, but the cap D on which it is supported is moving clockwise, so that the motion of R2 is decreased relative to W. The motion of R1 is however still equal to W so that the balance between R1 and R2 is disturbed, i. e., the motions are not cancelled, and therefore M follows the faster moving ring R1. When M follows the ring R1, they rotate the disc K and consequently the load shaft S2.

The variations in the speeds between S and S1 will therefore be reflected in the load shaft S2.

The reverse motion is obviously obtained when W moves faster than $P_0$.

By this device a series of motions at S2 can be obtained by imparting variable motions to shafts S and S1. The variation of speed of load shaft will depend upon the load required to be encountered by the said shaft.

I claim:

1. A speed control device which comprises, in combination: a housing; a primary drive shaft; a secondary drive shaft; said primary drive shaft and said secondary drive shaft being adapted to be driven at varying speeds with respect to each other; a load shaft which is adapted to be driven from said primary and secondary drive shafts through intermediate driving means, said load shaft being adapted to drive mechanism whose speed of operation is controlled through said speed control device; two toothed wheels on said primary drive shaft, one being fixed with respect to said shaft, and the other loosely mounted for free rotation thereon; a primary toothed wheel, said wheel being provided with teeth on both its inner and outer peripheries, said wheel being positioned within said housing in substantially the same vertical plane as said fixed toothed wheel; a plurality of shafts mounted on said loosely mounted toothed wheel; a plurality of intermediate pinions mounted on said shafts and positioned between said fixed toothed wheel and the teeth on the inner periphery of said primary toothed wheel, and serving to transmit motion from said fixed toothed wheel to said primary toothed wheel; a secondary driving pinion mounted on said secondary drive shaft for rotation therewith; a secondary driver wheel in said housing, said secondary driver wheel being toothed on its inner periphery, and having ball bearings in contact with its outer periphery and the interior of said housing for free rotation with respect to said housing, said teeth being in mesh with said secondary driving pinion, whereby said secondary driver wheel is driven from said secondary driving pinion; a driven disc having a lateral face portion, said disc being loosely mounted on said primary drive shaft and adapted to rotate freely thereon, said driven disc being formed with a cylindrical boss portion of reduced diameter; gear teeth formed on the circular periphery of said cylindrical boss portion; a plurality of pins adapted to act as shafts for pinions mounted on said lateral face portion of said driven disc; a plurality of pinions mounted on said pin shafts, said pinions being in mesh with said teeth on said secondary driver wheel, whereby they are driven from said secondary driver wheel, said pinions also being in mesh with said teeth on said outer periphery of said primary toothed wheel; and a toothed pinion wheel securely mounted on said load shaft, the gear teeth of said toothed pinion wheel being in mesh with said gear teeth on said cylindrical boss of said driven disc, whereby said last-named toothed pinion wheel, and said load shaft secured thereto, are positively driven from said driven disc.

2. A speed control device as defined in claim 1, wherein said loosely mounted toothed wheel on said primary drive shaft includes an end plate also loosely mounted on said primary drive shaft, and an annular laterally-extending side cap having openings; said end plate and said side cap being formed with races having ball bearings in said races; wherein said primary toothed wheel is mounted between said end plate and said side cap, and rotates on said ball bearings and wherein said intermediate pinions which engage said teeth on the inner periphery of said primary toothed wheel extend through said side cap openings provided therefor in said annular side cap.

3. A speed control device as defined in claim 2, in which said plurality of shafts on which said intermediate pinions are mounted are positioned within said annular laterally-extending side cap, said shafts extending between said loosely mounted toothed wheel and said side cap portion thereof.

4. A speed control device as defined in claim 1, in which said secondary driving pinion is positioned between said secondary driver wheel and said loosely mounted toothed wheel mounted on said primary drive shaft for free rotation thereon, said secondary driving pinion being in mesh both with said gear teeth on the periphery of said loosely mounted toothed wheel, and said teeth on the inner periphery of said secondary driver wheel, whereby both of said toothed wheels are driven from said secondary drive shaft and said secondary driving pinion at a speed depending on the rotational speed of said secondary drive shaft.

5. A speed control device as defined in claim 1, wherein a speed change gear box is introduced between said primary drive shaft and said secondary drive shaft, so that both of said shafts may be driven from the same prime mover, the speed of rotation of said secondary drive shaft being varied with respect to the speed of rotation of said primary drive shaft.

6. A speed control device as defined in claim 5, wherein said gear box includes a primary shaft and a secondary shaft, one of said shafts being formed as a hollow spindle; one set of toothed wheels mounted on said primary shaft, and a second set of toothed wheels mounted on said secondary shaft; keyways in said toothed wheels adjacent the interior of each toothed wheel; a longitudinal slot in said hollow spindle; a sliding rod carrying a key engaging said longitudinal slot, and adapted to engage one of said keyways; and a locking keyway formed in the end surface of said gear box, said locking keyway serving to lock said sliding rod.

7. A speed control device as defined in claim 6, wherein a shock absorbing coupling is introduced between said secondary drive shaft and said secondary shaft of said gear box on which said toothed wheels are mounted.

S. FIRASAT HUSSAIN.

REFERENCES CITED

The following references are of record in the file of this patent:

UNITED STATES PATENTS

| Number | Name | Date |
|---|---|---|
| 1,596,025 | Ross | Aug. 17, 1926 |
| 2,402,547 | Gilfillan | June 25, 1946 |

FOREIGN PATENTS

| Number | Country | Date |
|---|---|---|
| 516,793 | France | Dec. 10, 1920 |
| 856,769 | France | Apr. 1, 1940 |